(12) United States Patent
Nissel

(10) Patent No.: US 6,575,726 B1
(45) Date of Patent: Jun. 10, 2003

(54) APPARATUS FOR COOLING AN EXTRUDED PLASTIC SHEET

(75) Inventor: James C. Nissel, Malvern, PA (US)

(73) Assignee: Welex Incorporated, Blue Bell, PA (US)

( * ) Notice: Subject to any disclaimer, the term of this patent is extended or adjusted under 35 U.S.C. 154(b) by 288 days.

(21) Appl. No.: 09/655,554

(22) Filed: Sep. 6, 2000

(51) Int. Cl.⁷ ................................................ B29C 47/90
(52) U.S. Cl. ........................ 425/327; 428/363; 428/367; 428/DIG. 235
(58) Field of Search ........................... 425/194, 325, 425/327, 363, 367, 377, 379.1, DIG. 235; 264/175, 177.17, 177.19

(56) References Cited

U.S. PATENT DOCUMENTS

| | | | | |
|---|---|---|---|---|
| 2,771,388 A | * | 11/1956 | Rocky et al. ............... | 425/363 |
| 3,366,992 A | | 2/1968 | Seanor et al. ............... | 425/363 |
| 4,057,385 A | | 11/1977 | Yazaki et al. ............... | 425/327 |
| 4,311,658 A | * | 1/1982 | Nicoll ........................ | 425/363 |
| 4,448,739 A | * | 5/1984 | Baus ........................... | 264/175 |
| 4,695,239 A | * | 9/1987 | Klepsch et al. ............. | 425/327 |
| 4,734,229 A | * | 3/1988 | Johnson et al. ............. | 425/363 |
| 5,204,037 A | | 4/1993 | Fujii ........................... | 425/327 |
| 5,423,671 A | | 6/1995 | Imataki ....................... | 425/327 |
| 5,466,403 A | * | 11/1995 | Nissel ......................... | 425/327 |
| 5,912,026 A | | 6/1999 | Gokcen et al. ............. | 425/327 |
| 5,952,017 A | | 9/1999 | Nishida et al. ............. | 425/363 |
| 6,045,349 A | | 4/2000 | Ishida et al. ................ | 425/335 |
| 6,071,110 A | | 6/2000 | Mikkelsen ................... | 425/327 |

* cited by examiner

Primary Examiner—James P. Mackey
Assistant Examiner—Joseph Leyson
(74) Attorney, Agent, or Firm—Schnader Harrison Segal & Lewis LLP

(57) ABSTRACT

Accurately and uniformly cooling a preformed plastic sheet that is formed at elevated temperature in an elongated plastic sheet die, using upper, middle and lower vertically arranged cylindrical cooling rolls closely spaced to one another to engage the sheet between them, and providing one or more auxiliary cooling rolls connected to provide additional cooling for the sheet.

13 Claims, 6 Drawing Sheets

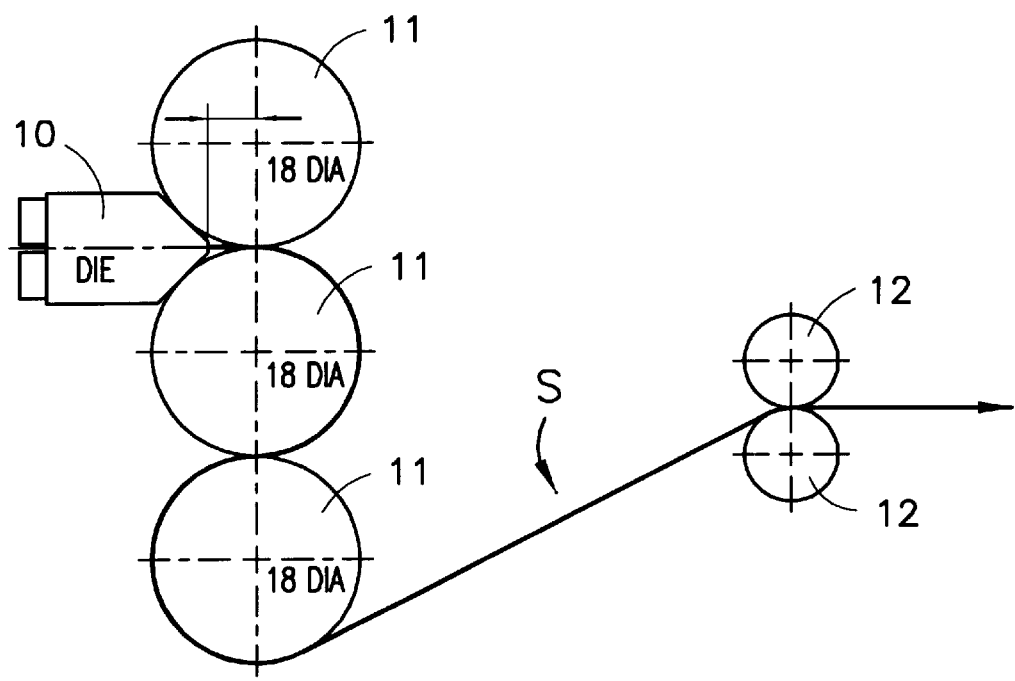
*Fig. 1*
CONVENTIONAL

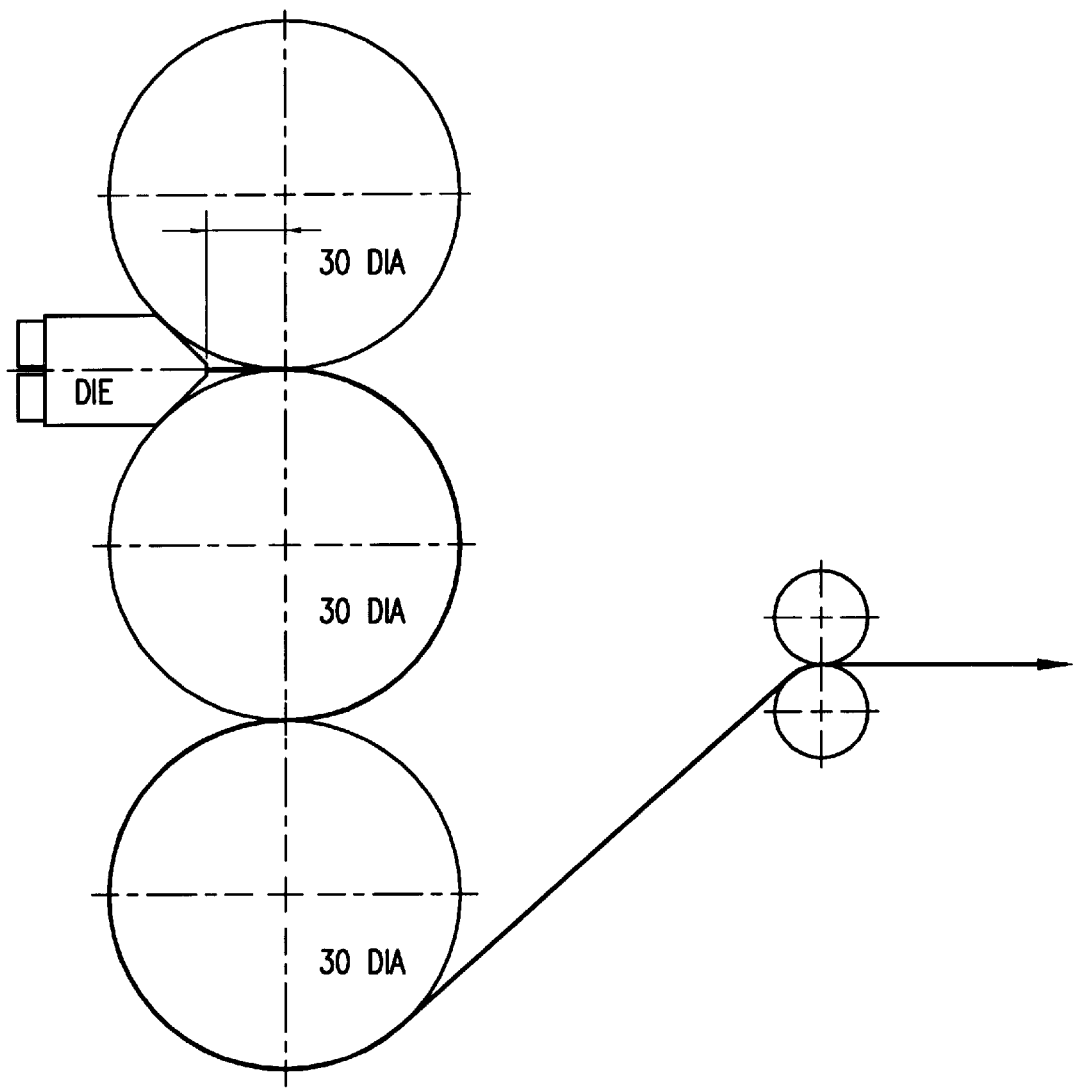
Fig. 2
CONVENTIONAL

APPARATUS FOR COOLING AN EXTRUDED PLASTIC SHEET

This invention relates to apparatus and method for accurately and uniformly cooling a hot, extruded polymeric sheet, and for providing auxiliary cooling for the sheet under mechanically stable, self-supporting conditions and without sagging or distortion.

Polymeric extruded or coextruded sheets are usually extruded out of a slit die of appropriate width, as indicated in the U.S. Patents to Frank R. Nissel U.S. Pat. Nos. 3,883,704, 3,918,865, 3,940,221, 3,959,431 and 4,533,510, for example. The hot sheet is then cooled by passing it through a pair or a series of temperature-controlled rolls. Although various roll numbers and arrangements may be used, three rolls are often used, sometimes in vertical planar alignment with each other. The gaps between the rolls are desired to be precisely adjusted according to the desired final sheet thickness. This precision is necessary for a variety of reasons, including elimination of air entrapment between the rolls, which causes adverse or uneven heat transfer or cooling.

Extruded plastic sheet is usually cooled with a vertically arranged three-roll stack wherein the middle roll is fixed in position but rotatable and the two upper and lower rolls are movably arranged to press gently against the sheet passing around the middle roll. This pressure assures air free contact with the rolls contacting the sheet for improved cooling.

In the field of plastic sheets, extrusion dies having variable lip portions have been used to form polymeric sheets of varying widths and thickness. Once extruded through an adjustable lip die, the polymeric sheet is substantially at its desired thickness. However, there is a demand for rapid cooling of a preformed polymeric sheet without excessively stressing the polymeric sheet product.

With increasing extrusion capacity, these cooling rolls have to be increased in diameter to provide sufficient cooling of the sheet. This diameter cannot always be increased sufficiently to assure adequate cooling of the sheet before leaving the last roll under mechanically stable, self-supporting conditions because of the increase of the die discharge distance from the first roll entrance. This excessive distance sometimes can cause sheet sagging and distortion prior to cooling, among other problems, because of the fluidity of the molten polymer. Fluid polymers like polyester are especially difficult to cool; they come out of the die with a consistency like liquid tar and are not very self supporting.

It has now been discovered that there is great advantage in adding a further roll (or set of rolls) to the system to assure sufficient cooling of the sheet. Such a cooling roll (or rolls) follow the third roll of the roll stack, but are not pressed against it because the gap would interact with the position of the third roll with respect to the second. It is, however, desirable to maintain a minimum gap between the bottom roll and each such auxiliary roll to minimize distortion of the still soft sheet between rolls. On the other hand, a substantial gap is required to thread the sheet through the roll train safely during start-up.

It is an object of this invention to create an improved apparatus and method of achieving a wide roll gap for threading with a closely controlled roll gap for accurate processing while using one or more auxiliary cooling rolls.

BRIEF DESCRIPTION OF THE DRAWINGS

FIG. 1 shows a conventional three-roll sheet take-off stack with equal diameter rolls and an extruder sheet die positioned at its upper entrance.

FIG. 2 shows a similar arrangement, but with larger rolls, also of equal diameter, for achieving larger cooling capacities, as is often required.

SUMMARY OF THE INVENTION

Figure 3:
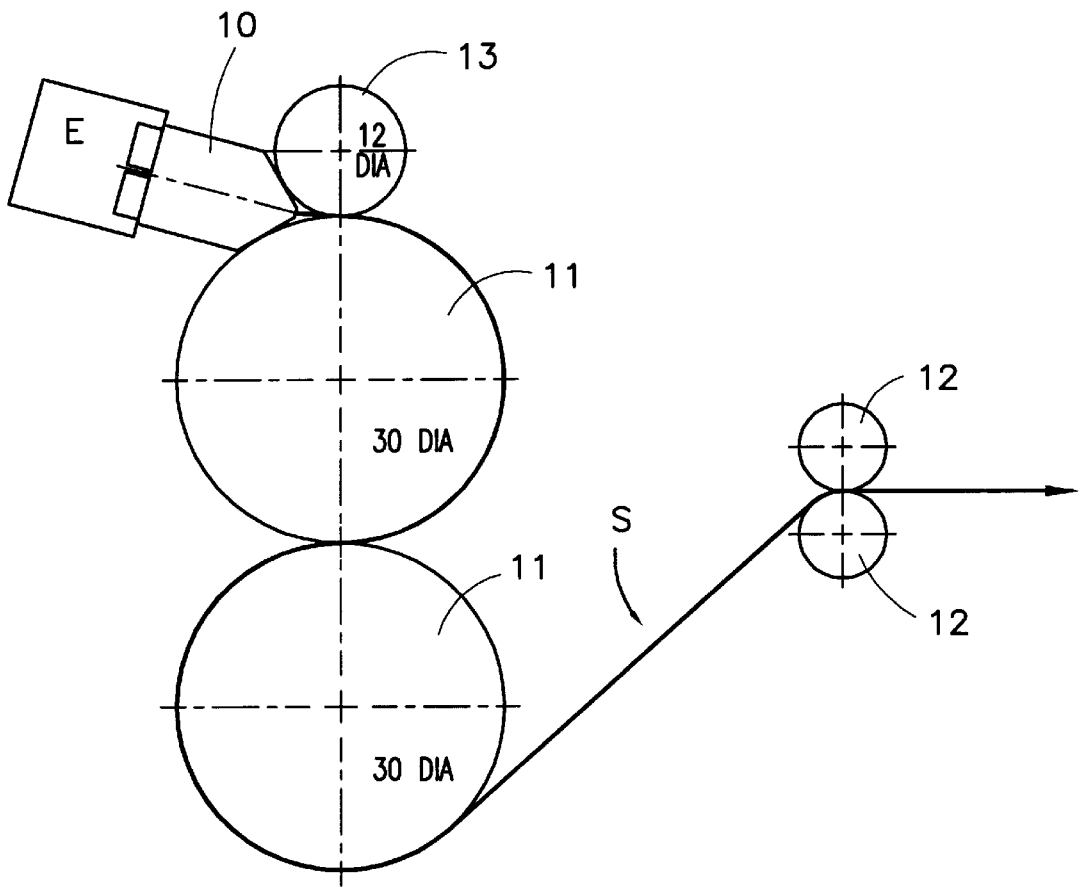
FIG. 3 shows a cooling roll arrangement with a smaller diameter upper roll and an inclined die position.

Various relative auxiliary roll arrangements are shown in FIGS. 3 to 6 of the drawings as specific examples for illustrative purposes, but are not intended as limitations on the scope of the invention. The rolls may be differently arranged with respect to each other, the purpose in all cases being to provide a better cooling path for the sheet, adjustable to provide a minimum of unsupported sheet while providing significant additional cooling. The closer proximity of the auxiliary rolls also increases the overall contact length with the sheet and therefore accelerates and improves cooling.

Turning to the drawings, FIGS. 1 and 2 are drawings of conventional arrangements and are not intended to be within the scope of this invention. The number 10 represents a die, receiving polymer from an extruder; the number 11 designates three cooling rolls arranged in a vertical stack. The hot polymer is ejected from the die 10 and flows between the uppermost two rolls 11, 11, is wound part way a round the middle roll 11 and party way around the lower roll 11, and then transported as a sheet S to the nip between two takeup rolls 12, 12.

FIG. 2 is the same as FIG. 1 except that the cooling rolls are larger to provide more cooling for the sheet.

DETAILED DESCRIPTION OF THE PREFERRED EMBODIMENTS

FIG. 3 is like FIG. 2 except that the upper roll 13 is smaller than the lower rolls 11, 11, and the die 10 is tilted, allowing it to deposit a sheet of hot polymer upon an upper surface of the middle roll 11, with closer spacing between the die 10 and the upper surface of the middle cooling roll 11. This has advantages for feeding low viscosity polymers such as polyethylene terephthalate (PET).

Figure 4:
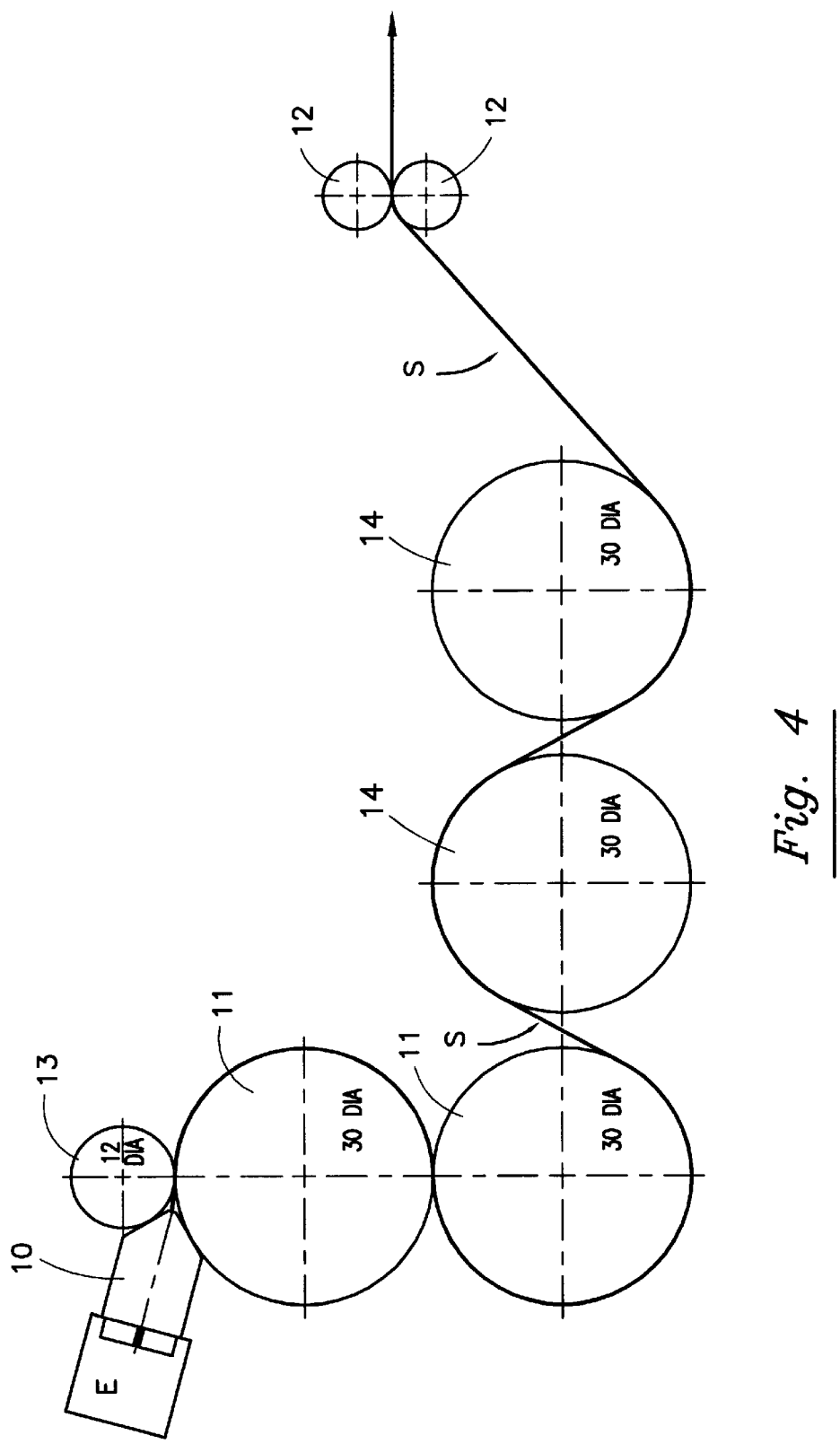
FIG. 4 shows a system according to this invention with two auxiliary cooling rolls positioned at an acceptable distance from the primary roll stack for threading. It is typically a distance of approximately 4" or more.

Turning to FIG. 4, two additional substantially horizontally arranged auxiliary cooling rolls 14, 14 are provided. They are spaced apart from each other to provide further cooling to the sheet S prior to guiding it between takeup rolls 12, 12. The rolls 14, 14 need not be of the same diameter with any of the preceding cooling rolls.

Figure 5:
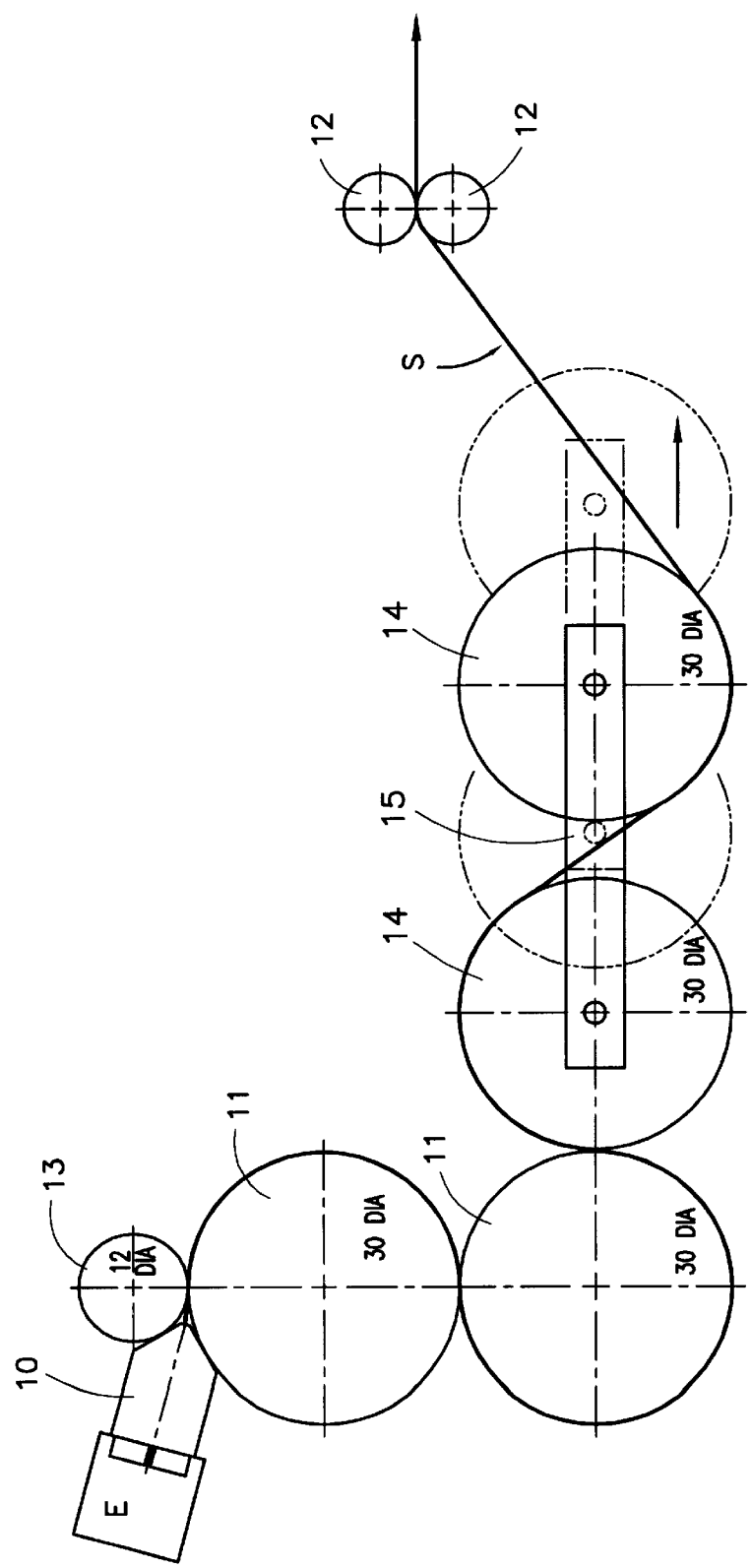
FIG. 5 shows another embodiment of this invention wherein the auxiliary cooling rolls are movably arranged to permit their positioning toward and away from to the primary roll stack. These rolls can be moved either as a group or individually, so that a close or wide gap can be obtained between the first and the second auxiliary and other cooling rolls.

In FIG. 5 the arrangement is the same as FIG. 4 except that the two auxiliary cooling rolls 14, 14 are mounted upon a horizontally-oriented movable support 15, so that they and their support can be moved back and forth in a generally horizontal direction, between the position shown in solid lines and the alternative position shown in dotted lines in FIG. 5.

Figure 6:
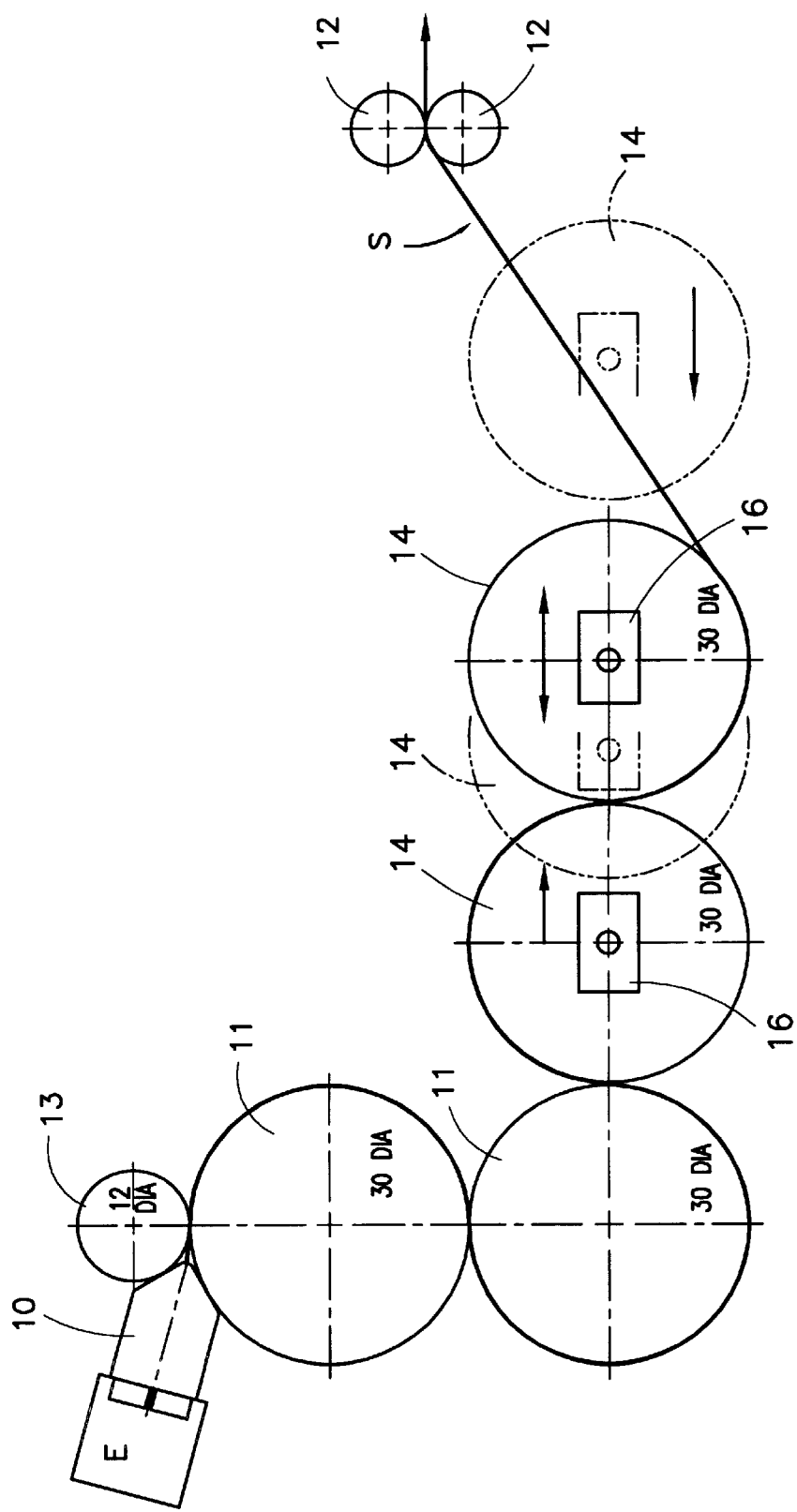
FIG. 6 shows two auxiliary cooling rolls in accordance with this invention wherein both are individually movable so that the roll gap between them can also be minimized or maximized for better sheet equipment handling and improved cooling.

FIG. 6 differs from FIG. 5 in that each of the auxiliary cooling rolls 14, 14 and their supports 16, 16 are independently capable of moving back and forth in a generally horizontal direction, toward and away from the lowermost cooling roll 11. Again, the solid lines indicate one available relative position, and the dotted lines indicate another available relative position of the substantially horizontally oriented rolls 14, 14. Various other positions may be substituted.

The substantially horizontal movability of auxiliary cooling rolls 14, 14 is important because, whenever the apparatus is to be started up, the original starting polymeric material from the die 10 can be quite soft, or even simply a molten glob, as in the case of polyester, for example. As the cooling process settles down after start-up, it takes on the configuration shown in FIG. 5, making it a necessity to move the horizontally oriented auxiliary cooling rolls 14, 14 back and forth with respect to each other after start-up. FIG. 6 shows that the individual horizontally oriented cooling rolls can be independently moved back and forth, and that the operator can shift them independently of the other horizontally oriented auxiliary cooling rolls, however many there might be.

An advantage of the small roll 13 at the top of the vertical stack is to allow the operator to position the sheet die 10 as close as possible to the middle cooling roll. Otherwise, there is a danger that air will enter underneath the soft fluid polymeric sheet that is being introduced, thereby developing air bubbles which undesirably penetrate into the sheet as it is being cooled. Often this is not necessary to do, especially in processing high molecular weight polymers.

In all cases in accordance with this invention in FIGS. 3–6, the letter "E" is intended to indicate an extruder for blending an extrudable plastic material and delivering it through the die 10. Further, the die 10 is a sheet die having an elongated transverse lip capable of delivering a polymeric material in sheet form. The entire sheet is preformed in the sheet die 10 and the rolls 13, 11, 11, 14, 14 perform primarily a cooling function but not a sheet-forming function.

Further, the rolls 13, 11 and 14 are driven at compatible peripheral velocities without substantially varying the tension on the sheet S as it passes from roll to roll, thereby applying uniform tension as sharply distinguished from a varying tension such as the tension used to stretch a sheet.

In accordance with this invention, a substantially steady tension is applied at all times to the sheet as it is drawn through the cooling rolls by the draw rolls 12, 12, and there is no effort to thin or stretch the sheet. Indeed, the sheet is cooled substantially independently of any significant stretching or thinning. Further, in accordance with this invention, there is no attempt to emboss either surface of the sheet S; its surface is kept smooth as it is drawn over and under the cooling rolls.

The die 10 is an elongated die, having a length equivalent to the width of the sheet that is being formed, and can be angled at an angle to the horizontal in a manner to permit the exit portion of the die lip to approach very closely to and above the middle cooling roll 11, as shown in FIGS. 3–6. This is advantageous in the case of a very soft polymer such as PET which is quite readily flowable; the soft polymer is supported by the middle roll 11 almost immediately after it has left the die 10. Otherwise there is a likelihood of sagging developing, especially when the extruded soft polymer sheet is at a high temperature.

It is in many cases acceptable to operate the apparatus without using an angled die as shown in FIGS. 3–6, especially in the processing of a relatively high viscosity polymer such as polypropylene (PP) and polystyrene (PS).

It is not important that the top roll diameter be any different than other rolls in the system.

It is also important to mention that the auxiliary cooling rolls 14,14 need not be the same diameter as any of the other preceding rolls. In some cases, we may need to build a machine with 3×12" diameter vertically arranged rolls to quickly cool both surfaces of the polymer, and then use two or more larger diameter cooling rolls to complete the cooling process.

Alternatively, it is possible, for example, to use 3×30" diameter vertically arranged rolls to accomplish most of the cooling and add a set of one or more smaller auxiliary cooling rolls to complete the cooling process. This might be preferred to a system using 3×36" or 3×42" diameter vertically arranged rolls where cost, size and shipping can all become important.

The maximum number of auxiliary cooling rolls 14,14 that might be used is indefinite. On lines where they have been used, 2 or 3 such rolls 14 are normal. However, one such roll 14 could be sufficient for some applications and as we try to achieve higher capacities, four or more may be necessary.

Although this invention has been disclosed in regard to specific embodiments thereof, which embodiments are provided as examples, the invention is not limited to the specific details disclosed; its scope is defined in the appended claims.

What is claimed is:

1. Apparatus for accurately and uniformly cooling a preformed plastic sheet that is formed at elevated temperature in an elongated plastic sheet die, comprising:

an elongated plastic sheet die for forming said sheet at elevated temperature;

a plurality of substantially vertically arranged substantially cylindrical cooling rolls rotating about substantially horizontal axes and closely spaced to one another with nips between them to engage said sheet between them, said rolls comprising at least an upper, a middle and a lower cooling roll; and one or a plurality of auxiliary cooling rolls downstream of said substantially vertically arranged rolls, and positioned out of pressure contact with the cylindrical cooling rools to further cool said sheet as it leaves said bottom cooling roll, wherein said elongated plastic sheet die has a narrow discharge shape for insertion into the existing space between said upper and middle cooling rolls and above an upper surface of said middle roll to continuously deposit said plastic sheet on the upper surface of said middle cooling roll adjacent to the nip between said upper and middle cooling rolls.

2. The apparatus defined in claim 1, wherein at least one said auxiliary cooling roll is substantially horizontally arranged relative to said substantially vertically arranged cooling rolls.

3. The apparatus defined in claim 2, wherein at least one said auxiliary cooling roll is adjustably mounted with capacity to move toward and away from said bottom cooling roll.

4. The apparatus defined in claim 3, wherein at least two of said auxiliary cooling rolls are independently horizontally adjustable toward and away from said bottom cooling roll.

5. The apparatus defined in claim 1 wherein said elongated sheet die is oriented at an angle to the surfaces of said upper and middle cooling rolls.

6. Apparatus for accurately and uniformly cooling a preformed plastic sheet that is formed at elevated temperature in an elongated plastic sheet die, comprising:

an elongated plastic sheet die for forming said sheet at elevated temperature;

a plurality of substantially vertically arranged substantially cylindrical cooling rolls rotating about substantially horizontal axes and closely spaced to one another with nips between them to engage said sheet between them, said rolls comprising at least an upper, a middle and a lower cooling roll; and one or a plurality of auxiliary cooling rolls downstream of said substantially vertically arranged rolls, and positioned out of pressure contact with the cylindrical cooling rolls to further cool said sheet as it leaves said bottom cooling roll, wherein said elongated plastic sheet die has a narrow discharge shape for insertion into the existing space between said upper and middle cooling rolls and above an upper surface of said middle roll to continuously deposit said plastic sheet on the upper surface of said middle cooling roll adjacent to the nip between said upper and middle cooling rolls, and wherein said plurality of auxiliary cooling rolls are substantially horizontally arranged relative to said substantially vertically arranged cooling rolls.

7. The apparatus defined in claim 6, wherein at least one said auxiliary cooling roll is adjustably mounted with capacity to move toward and away from said bottom cooling roll.

8. The apparatus defined in claim 7, wherein at least two of said auxiliary cooling rolls are independently horizontally adjustable toward and way from said bottom cooling roll.

9. Apparatus for accurately and uniformly cooling a preformed plastic sheet that is formed at elevated temperature in an elongated plastic sheet die, comprising:

an elongated plastic sheet die for forming said sheet at elevated temperature;

a plurality of substantially vertically arranged substantially cylindrical cooling rolls rotating about substantially horizontal axes and closely spaced to one another with nips between them to engage said sheet between them, said rolls comprising at least an upper, a middle and a lower cooling roll; and one or a plurality of auxiliary cooling rolls downstream of said substantially vertically arranged rolls, and positioned out of pressure contact with the cylindrical cooling rolls to further cool said sheet as it leaves said bottom cooling roll, wherein said elongated plastic sheet die has a narrow discharge shape for insertion into the existing space between said upper and middle cooling rolls and above an upper surface of said middle roll to continuously deposit said plastic sheet on the upper surface of said middle cooling roll adjacent to the nip between said upper and middle cooling rolls, and wherein the upper cooling roll has a diameter less than the diameter of the middle cooling roll to facilitate access of the elongated sheet die to the upper surface of the middle roll.

10. The apparatus defined in claim 9, wherein at least one said auxiliary cooling roll is substantially horizontally arranged relative to said substantially vertically arranged cooling rolls.

11. The apparatus defined in claim 10, wherein at least one said auxiliary cooling roll is adjustably mounted with capacity to move toward and away from said bottom cooling roll.

12. The apparatus defined in claim 11, wherein at least two of said auxiliary cooling rolls are independently horizontally adjustable toward and way from said bottom cooling roll.

13. The apparatus defined in claim 9, wherein said elongated sheet die is oriented at an angle to the surfaces of said upper and middle cooling rolls.

* * * * *